(12) United States Patent
Yu et al.

(10) Patent No.: US 12,524,854 B2
(45) Date of Patent: Jan. 13, 2026

(54) IMAGE PROCESSING METHOD AND APPARATUS, DEVICE AND STORAGE MEDIUM

(71) Applicant: BEIJING ZITIAO NETWORK TECHNOLOGY CO., LTD., Beijing (CN)

(72) Inventors: Lijuan Yu, Beijing (CN); Qili Deng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 183 days.

(21) Appl. No.: 18/551,783

(22) PCT Filed: Mar. 21, 2022

(86) PCT No.: PCT/CN2022/081881
§ 371 (c)(1),
(2) Date: Sep. 21, 2023

(87) PCT Pub. No.: WO2022/227929
PCT Pub. Date: Nov. 3, 2022

(65) Prior Publication Data
US 2024/0177379 A1 May 30, 2024

(30) Foreign Application Priority Data

Apr. 30, 2021 (CN) .......................... 202110482197.7

(51) Int. Cl.
*G06T 5/80* (2024.01)
*G06T 5/60* (2024.01)
(Continued)

(52) U.S. Cl.
CPC ................. *G06T 5/80* (2024.01); *G06T 5/60* (2024.01); *G06T 7/13* (2017.01); *G06T 11/203* (2013.01);
(Continued)

(58) Field of Classification Search
CPC ......... G06T 11/203; G06T 7/13; G06T 11/60; G06T 2207/30201; G06T 2210/44;
(Continued)

(56) References Cited

U.S. PATENT DOCUMENTS

| | | | |
|---|---|---|---|
| 5,999,651 A | | 12/1999 | Chang et al. |
| 2019/0362547 A1* | | 11/2019 | Lee .......................... G06T 15/04 |

(Continued)

FOREIGN PATENT DOCUMENTS

| | | | |
|---|---|---|---|
| CN | 109584151 A | | 4/2019 |
| CN | 110288519 A | | 9/2019 |

(Continued)

OTHER PUBLICATIONS

International Search Report and Written Opinion, International Patent Application No. PCT/CN2022/081881, May 16, 2022, with English translation (11 pages).

(Continued)

*Primary Examiner* — Jin Cheng Wang
(74) *Attorney, Agent, or Firm* — Astute IP Law Group

(57) ABSTRACT

The present disclosure provides an image processing method and apparatus, a device and a storage medium. The method comprises: first, determining a first contour point and a second contour point of a target object on an image to be processed, wherein the first contour point belongs to points on a first contour line of the target object, and the second contour point belongs to points on a second contour line of the target object; secondly, constructing, on the basis of the first contour point and the second contour point, a grid (Continued)

corresponding to the target object, and shifting the second contour point in the grid on the basis of a deformation parameter corresponding to the target object, to obtain a deformed grid; and then, generating, on the basis of the deformed grid, a deformed image corresponding to the target object. Hence, according to embodiments of the present disclosure, the grid of the target object on an image to be processed is deformed, such that the image processing function is realized, and the display effect of the target object on said image can be improved, thereby improving user experience.

16 Claims, 8 Drawing Sheets

(51) Int. Cl.
*G06T 7/13* (2017.01)
*G06T 11/20* (2006.01)
*G06T 11/60* (2006.01)

(52) U.S. Cl.
CPC .... *G06T 11/60* (2013.01); *G06T 2207/30201* (2013.01); *G06T 2210/44* (2013.01)

(58) Field of Classification Search
CPC ... G06T 5/80; G06T 2207/20081; G06T 5/60; G06T 3/18; G06T 5/77
See application file for complete search history.

(56) References Cited

U.S. PATENT DOCUMENTS

2019/0362561 A1* 11/2019 Lin ........................... G06T 7/50
2020/0226831 A1* 7/2020 Su ............................ G06T 7/251
2020/0334874 A1* 10/2020 Phogat .................. G06T 11/001

FOREIGN PATENT DOCUMENTS

| CN | 111489311 A | 8/2020 |
|---|---|---|
| CN | 111652795 A | 9/2020 |
| CN | 112102198 A | 12/2020 |

OTHER PUBLICATIONS

First Office Action for Chinese Application No. 202110482197.7, mailed on May 21, 2025, 18 pages.
Qiang D., "Research on face deformation algorithm", China Excellent Master's Degree Thesis Full-text Database Information Technology Series, No. 3, Mar. 15, 2008 pp. 138-422.

* cited by examiner 1a　　　1b　　　1c

IMAGE PROCESSING METHOD AND APPARATUS, DEVICE AND STORAGE MEDIUM

This application is a national stage of International Application No. PCT/CN2022/081881, filed on Mar. 21, 2022, which claims the priority to Chinese Patent Application No. 202110482197.7, titled "IMAGE PROCESSING METHOD AND APPARATUS, DEVICE AND STORAGE MEDIUM", filed on Apr. 30, 2021 with the Chinese Patent Office, both of which are incorporated herein by reference in their entireties.

FIELD

The present disclosure relates to the field of image processing, and in particular to an image processing method, an image processing apparatus, a device, and a storage medium.

BACKGROUND

With the development of computer technology, people have higher and higher demands for image processing. For example, in the aesthetics of a human image, an appropriate height of the calvarium is an important factor. Typically, the appropriate height of the calvarium refers to that a ratio of a distance between the front hairline and the top of the head to a distance between the hairline and the eyebrow is approximately 1:1, as shown in 1a in FIG. 1. If the ratio is greater than 1:1, it indicates that the calvarium is too high, as shown in 1b in FIG. 1. Otherwise, if the ratio is much less than 1:1, it indicates that the calvarium is too low, as shown in 1c in FIG. 1. The calvarium being too high or too low will affect the aesthetics of the human image.

Therefore, in the field of image processing, it is desired to solve the technical problem of how to enrich image processing to meet user requirements and improve the effect of image processing.

SUMMARY

In order to solve or at least partially solve the above technical problem, an image processing method and an image processing apparatus, a device, and a storage medium are provided, in which an image processing function is achieved by deforming a grid of a target object in a to-be-processed image, to improve the display effect of the target object in the to-be-processed image and improve the user experience.

In a first aspect, an image processing method is provided in the present disclosure. The image processing method includes:
 determining a first contour point and a second contour point of a target object in a to-be-processed image, where the first contour point is on a first contour line of the target object, and the second contour point is on a second contour line of the target object;
 constructing a grid corresponding to the target object based on the first contour point and the second contour point;
 shifting the second contour point in the grid based on a deformation parameter corresponding to the target object, to obtain a deformed grid, where the deformation parameter is used to determine shifting data of the second contour point; and
 generating a deformed image corresponding to the target object based on the deformed grid.

In a possible embodiment, before constructing the grid corresponding to the target object based on the first contour point and the second contour point, the method further includes:
 determining a third contour point of the target object, where the third contour point is on a third contour line of the target object; and
 accordingly the constructing the grid corresponding to the target object based on the first contour point and the second contour point includes:
 constructing the grid corresponding to the target object based on the first contour point, the second contour point and the third contour point.

In a possible embodiment, the deformation parameter includes a deformation input parameter and preset deformation key point, and the shifting the second contour point in the grid based on the deformation parameter corresponding to the target object, to obtain the deformed grid includes:
 determining a target second contour point from the second contour point in the grid, and determining a target deformation key point from the preset deformation key point;
 determining whether the target second contour point is in an influence area of the target deformation key point based on a distance between the target second contour point and the target deformation key point, to obtain a determination result, where the determination result is used to indicate whether the target second contour point is in the influence area of the target deformation key point;
 determining shifting data corresponding to the target second contour point, based on the determination result; and
 shifting the target second contour point in the grid based on the shifting data, to obtain the deformed grid.

In a possible embodiment, the determining the shifting data corresponding to the target second contour point, based on the determination result includes:
 in a case that the determination result indicates that the target second contour point is in the influence area of the target deformation key point, determining the shifting data corresponding to the target second contour point based on the deformation input parameter corresponding to the target object and a preset directional vector corresponding to the target deformation key point,
 where the shifting data corresponding to the target second contour point includes a shifting direction and a shifting distance of the target second contour point, the deformation input parameter is used to determine the shifting direction and shifting distance, and the preset directional vector is used to determine the shifting direction.

In a possible embodiment, the determining the shifting data corresponding to the target second contour point based on the deformation input parameter corresponding to the target object and the preset directional vector corresponding to the target deformation key point includes:
 determining a first shifting parameter corresponding to the target second contour point, based on a distance between the target second contour point and the target deformation key point; and
 determining the shifting data corresponding to the target second contour point, based on the first shifting parameter, the deformation input parameter corresponding to the target object, and the preset directional vector corresponding to the target deformation key point.

In a possible embodiment, the target deformation key point includes a preset key point pair, and the preset directional vector corresponding to the target deformation key point is determined by the preset key point pair.

In a possible embodiment, the determining the first contour point and the second contour point of the target object in the to-be-processed image includes:
    determining the first contour point and the second contour point of the target object in the to-be-processed image, based on a machine learning model.

In a possible embodiment, the generating the deformed image corresponding to the target object based on the deformed grid includes:
    determining, in the deformed grid, a target area enclosed by the second contour point before and after being shifted; and
    drawing the target area based on a positional relationship between the target area and a predetermined area of the target object, to obtain the deformed image corresponding to the target object, In a possible embodiment, the drawing the target area based on the positional relationship between the target area and the predetermined area of the target object, to obtain the deformed image corresponding to the target object includes:
    in response to determining that the target area is not in the predetermined area of the target object, drawing the target area based on image data in an area enclosed by the first contour line and the second contour line on the to-be-processed image, and obtaining the deformed image corresponding to the target object.

In a possible embodiment, before obtaining the deformed image corresponding to the target object, the method further includes:
    drawing, in a compressing manner, an area enclosed by the shifted second contour point and the third contour point in the deformed grid, based on image data in an area enclosed by the second contour line and the third contour line on the to-be-processed image.

In a possible embodiment, the drawing the target area based on the positional relationship between the target area and the predetermined area of the target object, to obtain the deformed image corresponding to the target object includes:
    in response to determining that the target area is in a predetermined hair area of a target calvarium object, drawing the target area based on image data in an area enclosed by the second contour line and the third contour line on the to-be-processed image, and obtaining the deformed image corresponding to the target object.

In a possible embodiment, before obtaining the deformed image corresponding to the target object, the method further includes:
    drawing, in a stretching manner, an area enclosed by the shifted second contour point and the third contour point in the deformed grid, based on image data in an area enclosed by the second contour line and the third contour line on the to-be-processed image.

In a second aspect, an image processing apparatus is provided in the present disclosure. The image processing apparatus includes:
    a first determining module configured to determine a first contour point and a second contour point of a target object in a to-be-processed image, where the first contour point is on a first contour line of the target object, and the second contour point is on a second contour line of the target object;
    a constructing module configured to construct a grid corresponding to the target object based on the first contour point and the second contour point;
    a shifting module configured to shift the second contour point in the grid based on a deformation parameter corresponding to the target object, to obtain a deformed grid, where the deformation parameter is used to determine shifting data of the second contour point; and
    a generating module configured to generate a deformed image corresponding to the target object based on the deformed grid.

In a third aspect, a computer-readable storage medium is provided in the present disclosure. The computer-readable storage medium stores instructions. The instructions, when being executed by a terminal device, cause the terminal device to perform the above method.

In a fourth aspect, a device is provided in the present disclosure. The device includes: a memory, a processor, and a computer program stored in the memory and executable by the processor. The processor, when executing the computer program, performs the above method.

In a fifth aspect, a computer program product is provided in the present disclosure. The computer program product includes a computer program/instruction. The computer program/instruction, when being executed by a processor, performs the above method.

Compared with the existing technology, the technical solution of the embodiments in the present disclosure has at least the following advantageous.

In the image processing method according to the embodiments of the present disclosure, firstly, a first contour point and a second contour point of a target object on a to-be-processed image are determined, where the first contour point is on a first contour line of the target object, and the second contour point is on a second contour line of the target object. A grid corresponding to the target object is constructed based on the first contour point and the second contour point; and the second contour point in the grid is shifted based on a deformation parameter corresponding to the target object, to obtain a deformed grid. Then, a deformed image corresponding to the target object is generated based on the deformed grid. Therefore, in the embodiments of the present disclosure, an image processing function is achieved by deforming the grid of the target object in the to-be-processed image, which can improve the display effect of the target object in the to-be-processed image and improve the user experience.

BRIEF DESCRIPTION OF THE DRAWINGS

The drawings herein are incorporated into the specification and constitute a part of the specification, which show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings may be obtained according to the provided drawings without any creative effort.

DETAILED DESCRIPTION OF EMBODIMENTS

In order to make the above purposes, features, and advantage of the present disclosure clearer to understand, the technical solutions in the embodiments of the present disclosure will be described in detail hereinafter. It should be noted that the embodiments of the present disclosure and the features in the embodiments may be combined with each other in the case of no conflict.

Although many specific details are set forth in the following description to facilitate a full understanding of the present disclosure, the present disclosure may be implemented in other ways than those described herein. Apparently, the embodiments in the specification are only some of, rather than all, embodiments of the present disclosure.

With the development of computer technology, people have higher and higher demands for image processing. For example, in the aesthetics of a human image, an appropriate height of the calvarium is an important factor. In order to improve the overall aesthetic degree of the human image, the height of the calvarium can be adjusted through image processing to improve the display effect of the calvarium.

In order to enrich image processing, an image processing method is provided in the present disclosure. Firstly, a first contour point and a second contour point of a target object in a to-be-processed image are determined, where the first contour point is on a first contour line of the target object, and the second contour point is on a second contour line of the target object. A grid corresponding to the target object is constructed based on the first contour point and the second contour point; and the second contour point in the grid is shifted based on a deformation parameter corresponding to the target object, to obtain a deformed grid. Then, a deformed image corresponding to the target object is generated based on the deformed grid. Therefore, in the embodiments of the present disclosure, an image processing function is achieved by deforming the grid of the target object in the to-be-processed image, which can improve the display effect of the target object in the to-be-processed image and improve the user experience. Thus, in the embodiments of the present disclosure, the points located on the calvarium edge line are shifted to deform the grid of the target calvarium and obtain the deformed calvarium, thereby improving the aesthetic degree of the target calvarium and the aesthetic experience of the user.

Figure 2:
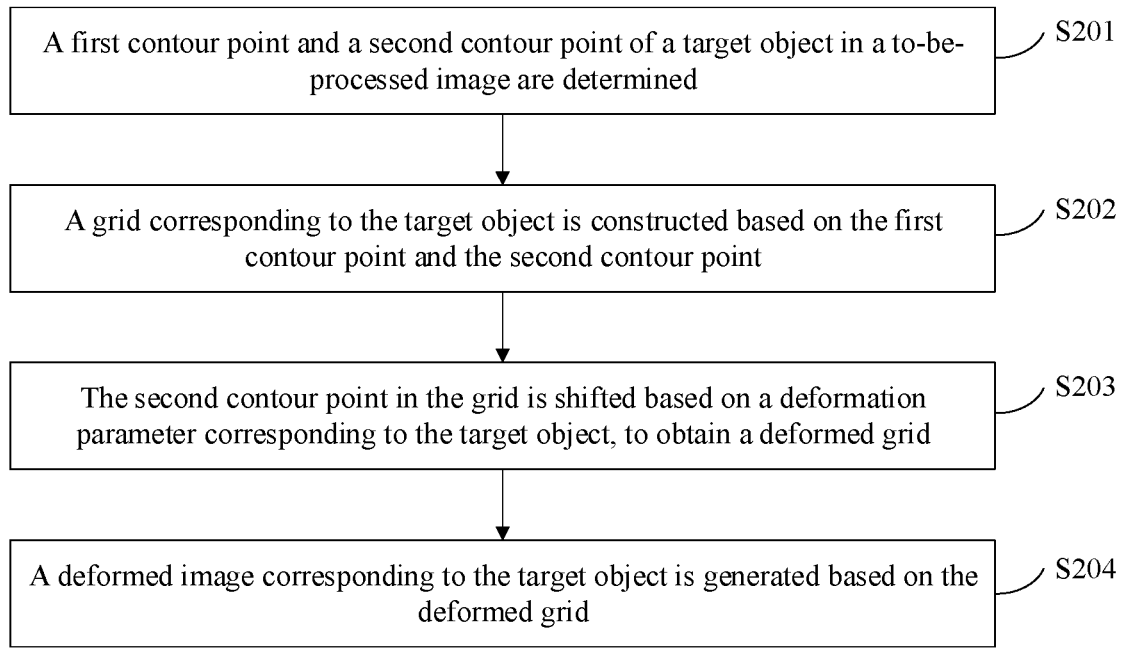
FIG. 2 is a flowchart of an image processing method according to an embodiment of the present disclosure.

Based on the above, an image processing method is provided according to an embodiment of the present disclosure. FIG. 2 is a flowchart of an image processing method according to an embodiment of the present disclosure. The method includes steps S201 to S204.

In step S201, a first contour point and a second contour point of a target object in a to-be-processed image are determined.

The first contour point is on a first contour line of the target object, and the second contour point is on a second contour line of the target object.

The to-be-processed image in an embodiment of the present disclosure may include a human image, an animal image, or other types of images. The target object may be a human part such as the calvarium or face in a human image, or may be a calvarium or face in an animal image.

Figure 1:
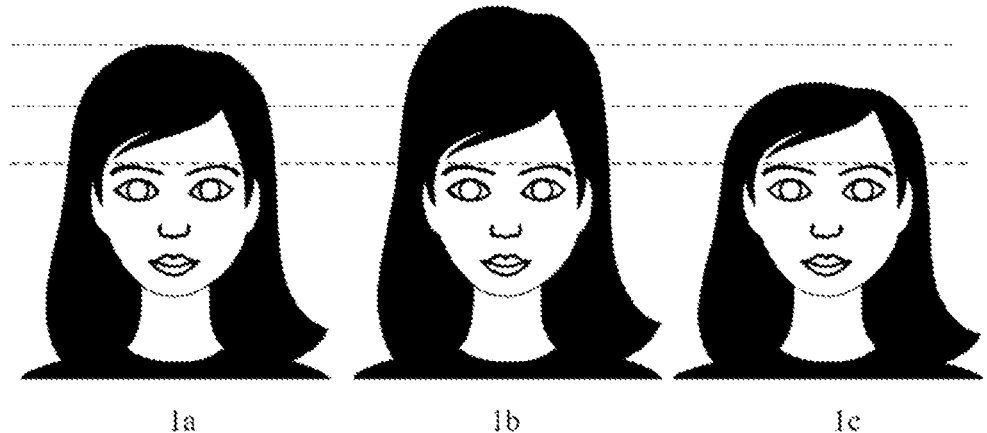
FIG. 1 is a schematic diagram of comparison of calvarium effects.

In an embodiment of the present disclosure, taking a human image as an example, before the first contour point and the second contour point are determined, a to-be-processed human image and a target object in the to-be-processed human image are first determined. As shown in FIG. 1, images 1a, 1b and 1c can each be used as the to-be-processed image. Specifically, the to-be-processed image may be captured in real time, or selected by a user. The embodiment does not limit the source of the to-be-processed image.

The to-be-processed image in an embodiment of the present disclosure includes a target object. In the present embodiment, the target object in the to-be-processed image is processed by deforming the grid corresponding to the target object, to improve the aesthetic degree of the target object.

In practical applications, after the target object in the to-be-processed image is determined, the first contour point and the second contour point of the target object are determined. The first contour point is a point determined on a first contour line of the target object, and the second contour point is a point determined on a second contour line of the target object.

In an optional implementation, the first contour point and the second contour point of the target object in the to-be-processed image may be determined based on a machine learning model. It should be noted that the method for determining the first contour point and the second contour point is not limited in the embodiments of the present disclosure.

The to-be-processed image in an embodiment of the present disclosure may include a human image, and the target object may include a target calvarium of the human image. The first contour line may be a hairline of the target calvarium, and the second contour line may be a calvarium edge line of the target calvarium.

Figure 3:
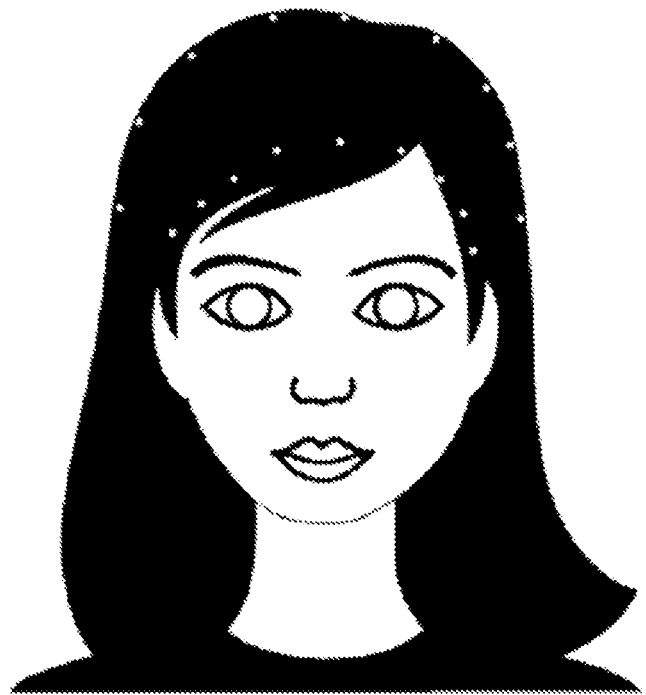
FIG. 3 is a schematic diagram of distribution of a first contour point and a second contour point according to an embodiment of the present disclosure.

Assuming that the target object is the target calvarium, FIG. 3 shows distribution of a first contour point and a second contour point according to an embodiment of the present disclosure. The point on the hairline is the first contour point, and the point on the calvarium edge line is the second contour point.

In order to ensure the deformation effect of the target calvarium, the first contour points and the second contour points may be evenly distributed. In an optional implementation, taking the first contour point No. 0 as the center point, there are 6 first contour points on each side of the first contour point No. 0, which means a total of 13 first contour points are determined on the target calvarium. The second contour points respectively corresponding to the first contour points are determined on the calvarium edge line of the target calvarium.

It is noted that the numbers and distribution of the first contour points and the second contour points are not limited in the embodiments of present disclosure.

In step S202, a grid corresponding to the target object is constructed based on the first contour point and the second contour point.

In an embodiment of the present disclosure, after determining the first contour point and the second contour point of the target object, a grid corresponding to the target object is constructed based on the first contour point and the second contour point. The first contour point and the second contour point are all vertices of the grid corresponding to the target object.

Figure 4:
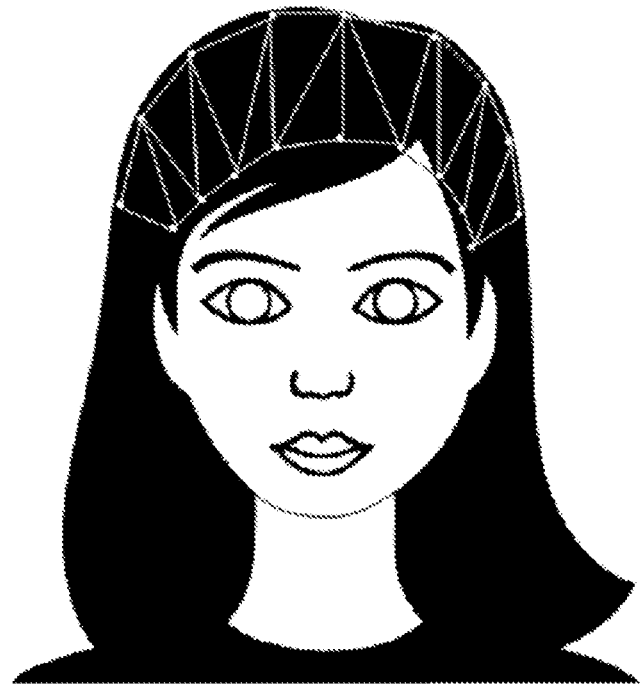
FIG. 4 is a schematic diagram of a grid corresponding to a target calvarium according to an embodiment of the present disclosure.

Assuming that the target object is the target calvarium, FIG. 4 is a schematic diagram of a grid corresponding to a target object according to an embodiment of the present disclosure. Specifically, the grid is constructed based on the first contour point and the second contour point shown in FIG. 3.

It is noted that the construction method of the grid of the target object is not limited in the embodiments of the present disclosure.

In step S203, the second contour point in the grid is shifted based on a deformation parameter corresponding to the target object, to obtain a deformed grid.

The deformation parameter is used to determine shifting data of the second contour point.

In an embodiment of the present disclosure, after the grid corresponding to the target object has been constructed, the second contour point in the grid is shifted based on the deformation parameters corresponding to the target object, to obtain the deformed grid.

In an optional implementation, the deformation parameter corresponding to the target object includes a deformation input parameter and preset deformation key point. The deformation input parameter is inputted by the user, which indicates a deformation degree of an expected target object. The preset deformation key point is a preset key point used to determine shifting data of the second contour point. In an embodiment of the present disclosure, the second contour point in the grid is shifted based on the deformation input parameter and preset deformation key point corresponding to the target object, while the positions of other points in the grid than the second contour point remain unchanged (i.e. not shifted), resulting in deformation of the grid.

In an optional implementation, a user may trigger a deformation adjustment operation on the target object through a sliding bar on an operation interface. After the deformation adjustment operation on the target object is received, a deformation parameter corresponding to the target object is determined. For example, it is assumed that the target object is the target calvarium, and the sliding range of the sliding bar is 0 to 100. If the sliding bar is adjusted within the range of 0 to 50, it indicates that the user expects to lower the target calvarium. Otherwise, if the sliding bar is adjusted within the range of 50 to 100, it indicates that the user expects to raise the target calvarium. For another example, the sliding range of the sliding bar is centered at 0, with a sliding radius of 50 (i.e., the range of −50 to 50). If the slider is adjusted within the range of −50 to 0, it indicates that the user expects to lower the target calvarium. Otherwise, if the slider is adjusted within the range of 0 to 50, it indicates that the user expects to raise the target calvarium. The setting method of the sliding range of the sliding bar is not limited in the embodiments of the present disclosure.

In an embodiment of the present disclosure, the preset deformation key point is used to determine the shifting data of the second contour point. The shifting data may include a shifting direction, a shifting distance, and the like.

Figure 5:
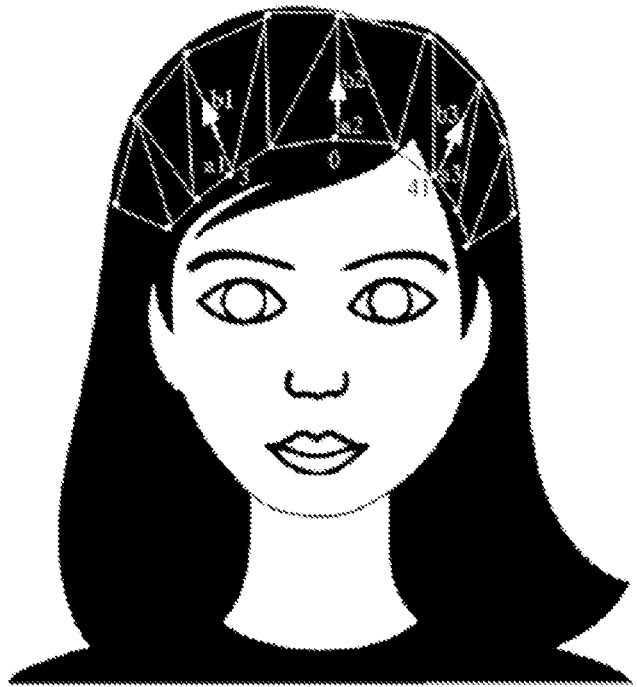
FIG. 5 is a schematic diagram of preset deformation key point according to an embodiment of the present disclosure.

In practical applications, after the deformation input parameter and the preset deformation key point corresponding to the target object are determined, a target second contour point is determined from the second contour point in the grid, and a target deformation key point is determined from the preset deformation key point. FIG. 5 is a schematic diagram of preset deformation key point according to an embodiment of the present disclosure. Assuming that the target second contour point is the second contour point corresponding to number 0 in FIG. 5, and the target deformation key point is a1. It should be noted that the target deformation key point may be any point on the to-be-processed image. For example, the target deformation key point may include a point that is not on the grid of the target object. Preferably, in a scene where the target object is the target calvarium, the target deformation key point may be set in the hair area based on the calvarium deformation requirements. After the target second contour point and the target deformation key point are determined, whether the target second contour point is in an influence area of the target deformation key point is determined, based on a distance between the target second contour point and the target deformation key point, to obtain a determination result. Then, the shifting data corresponding to the target second contour point is determined based on the determined result. The target second contour point in the grid is shifted based on the shifted data, to obtain the deformed grid.

According to the above method, multiple target deformation key points may be determined based on the preset deformation key points. As shown in FIGS. 5, a2 and a3 may be determined as target deformation key points to execute the above process, and the target second contour point in the grid is respectively shifted relative to the target deformation key points a2 and a3. The specific implementation can be understood by referring to the above description of the target deformation key point a1, which will not be repeated herein.

In an optional implementation, if the determination result indicates that the target second contour point is in the influence area of the target deformation key point, the shifting data corresponding to the target second contour point is determined based on the deformation input parameter of the target object and the preset directional vector corresponding to the target deformation key point. Then, the target second contour point in the grid is shifted based on the shifting data. By the above method, each second contour point in the grid is shifted by using each second contour point in the grid as the target second contour point and using each preset deformation key point as the target deformation key point, to finally obtain the deformed grid.

The deformation input parameter in an embodiment of the present disclosure is used to determine the shifting direction and distance of the target second contour point, and the preset directional vector is used to determine the shifting direction of the target second contour point.

In an optional implementation, firstly, a first shifting parameter corresponding to the target second contour point is determined based on the distance between the target second contour point and the target deformation key point. The first shifting parameter is directly proportional to the distance. Then, the product of the first shifting parameter, the deformation input parameter corresponding to the target object, and the preset directional vector corresponding to the target deformation key point is determined as the shifting data corresponding to the target second contour point. Then, the target second contour point in the grid is shifted based on the shifting data, to obtain the deformed grid.

In practical applications, a distance distance(curPoint, a) between the target second contour point and the target deformation key point may be calculated first, where curPoint represents the target second contour point and a represents the target deformation key point. Then, based on the distance(curPoint, a), it is determined whether the target second contour point curPoint is in the influence area of the target deformation key point a. Specifically, if the distance (curPoint, a) is less than a preset threshold, it indicates that the target second contour point curPoint is in the influence area of the target deformation key point a. If the distance (curPoint, a) is not less than the preset threshold, it indicates that the target second contour point curPoint is not in the influence area of the target deformation key point a.

When the target second contour point curPoint is in the influence area of the target deformation key point a, the first shifting parameter corresponding to the target second contour point curPoint may be determined based on the distance (curPoint, a). Specifically, the first shifting parameter infect may be calculated by using the following formula (1):

$$\text{inffect} = \text{distance}(\text{curPoint}, a)/\text{radius} \tag{1}$$

In the formula, radius is used to indicate a control range of the target deformation key point a, which is usually a preset empirical constant value. After the first shifting parameter inffect is determined, the product of the first shifting parameter inffect, the deformation input parameter corresponding to the target calvarium, and the preset directional vector corresponding to the target deformation key point is determined as the shifting data of the target second contour point.

In an optional implementation, the target second contour point in the grid may be shifted by using the following formulas (2) and (3):

$$\text{curPoint} = \text{curPoint} + T; \tag{2}$$

$$T = \text{hardnessAdjust}(\text{inffect}, \text{movHardness}) \\ *\text{intensity}*\text{direction}(b, a) \tag{3}$$

In the formulas, T represents the shifting data of the target second contour point curPoint, which includes the shifting direction and the shifting distance. HardnessAdjust( ) is a concentration adjustment function, and movHardness is the preset empirical constant value. Based on the formula (1) inffect=distance(curPoint,a)/radius, it can be determined that the distance(curPoint,a) is directly proportional to inffect, while the value of hardnessAdjust(affect, movHardness) is inversely proportional to infect. Therefore, a value of hardnessAdjust(affect, movHardness) is inversely proportional to distance(curPoint,a). The larger the distance(curPoint,a) is, the smaller the value of hardnessAdjust(affect, movHardness) is, and correspondingly the smaller the shifting distance of the target second contour point corresponding to T is. That is, in the influence range of the target deformation key point, the target second contour point that is far away from the target deformation key point has a small shifting distance. "Intensity" is used to represent the deformation input parameter, which is usually in the range of [−1,1]. Assuming the target object is the target calvarium, the intensity greater than 0 indicates that the user expects to raise the calvarium, and the intensity less than 0 indicates that the user expects to lower the calvarium. Direction(b, a) is used to represent the preset directional vector corresponding to the target deformation key point a, which represents the shifting direction of the target second contour point curPoint.

In an optional implementation, the target deformation key point may include a preset key point pair. A point b corresponding to the target deformation key point a is preset to form a key point pair (a, b). The preset directional vector direction(b, a) is determined based on the target deformation key point a and the point b.

In an embodiment of the present disclosure, after the calculation result of the above formula is obtained, each second contour point on the grid of the target object is shifted based on the above method, to finally obtain the deformed grid.

In addition, in order to ensure the deformation effect of the target object and avoid the reduction of the aesthetic degree caused by uneven deformation, the preset deformation key point in an embodiment of the present disclosure may include at least three key point pairs, such as (a1, b1), (a2, b2) and (a3, b3) as shown in FIG. 5, where a1, a2 and a3 may respectively be a point on the line connecting the first contour point No. 3 with the corresponding second contour point, a point on the line connecting the first contour point No. 0 with the corresponding second contour point, and a point on the line connecting the first contour point No. 41 with the corresponding second contour point. The number of the first contour points is randomly set and does not indicate anything. The point b1 may be on a line connecting a1 with the corresponding second contour point, b2 may be on a line connecting a2 with the corresponding second contour point, and b3 may be on a line connecting a3 with the corresponding second contour point. The direction (b1, a1) refers to the directional vector from a1 to b1. Assuming that the target object is the target calvarium, as shown in FIG. 5, since a1, a2, and a3 are distributed on the target calvarium in different directions, it is beneficial to ensure the deformation effect of the calvarium and avoid the reduction of the aesthetic degree of the target calvarium due to uneven deformation, such as excessive deformation in one direction.

In step S204, a deformed image corresponding to the target object is generated based on the deformed grid.

In this embodiment, after the second contour point in the grid is shifted to obtain the deformed grid, a deformed image corresponding to the target object is generated based on the deformed grid.

In this embodiment, assuming that the target object is the target calvarium, the deformed calvarium in the deformed image has the effect of raising or lowering the target calvarium, thereby improving the aesthetic degree of the target calvarium.

In the image processing method according to the embodiment of the present disclosure, firstly, a first contour point and a second contour point of a target object on a to-be-processed image are determined, where the first contour point is on a first contour line of the target object, and the second contour point is on a second contour line of the target object. A grid corresponding to the target object is constructed based on the first contour point and the second contour point; and the second contour point in the grid is shifted based on a deformation parameter corresponding to the target object, to obtain a deformed grid. Then, a deformed image corresponding to the target object is generated based on the deformed grid. Therefore, in the embodiments of the present disclosure, an image processing function is achieved by deforming the grid of the target object in the to-be-processed image, which can improve the display effect of the target object in the to-be-processed image and improve the user experience.

On the basis of the above embodiments, in order to reduce the impact on the background area of the to-be-processed image caused by deformation of the target object, the grid corresponding to the target object may be constructed with reference to the points on a third contour line of the target object.

Figure 6:
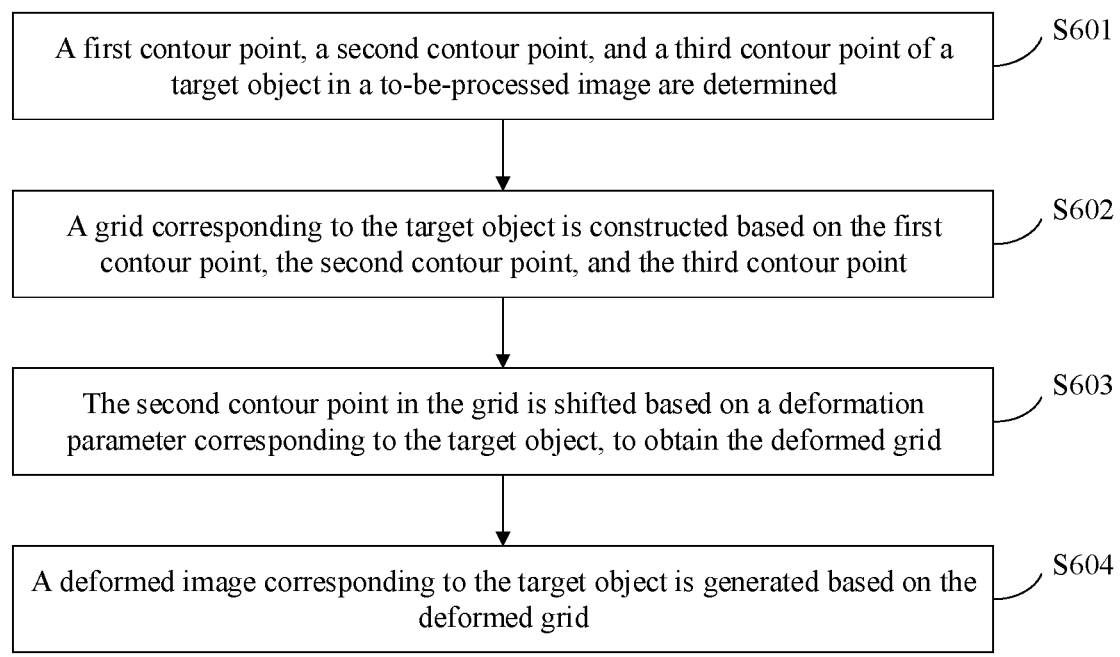
FIG. 6 is a flowchart of an image processing method according to another embodiment of the present disclosure.

In this regard, an image processing method is provided according to another embodiment of the present disclosure. FIG. 6 is a flowchart of an image processing method according to another embodiment of the present disclosure, which includes steps S601 to S604.

In step S601, a first contour point, a second contour point, and a third contour point of a target object in a to-be-processed image are determined.

The first contour point is on a first contour line of the target object, the second contour point is on a second contour line of the target object, and the third contour point is on a third contour line of the target object.

Figure 7:
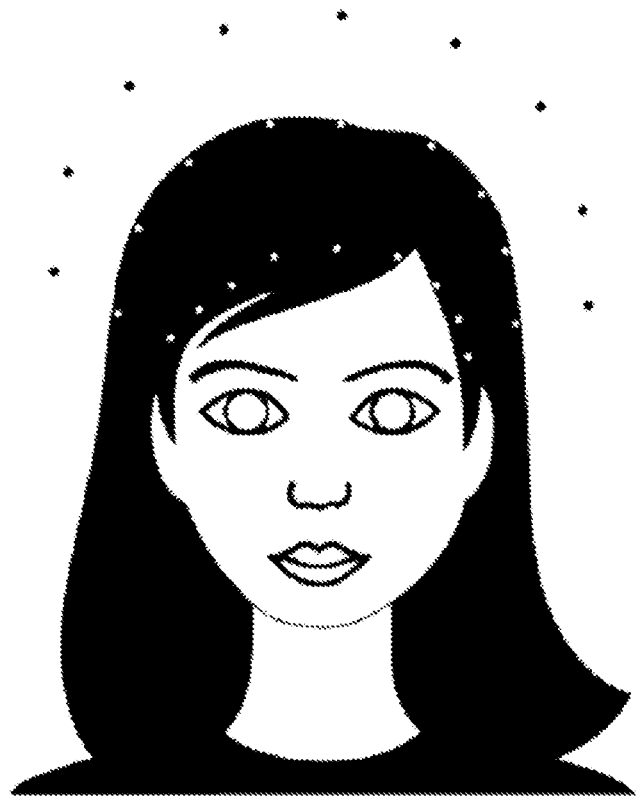
FIG. 7 is a schematic diagram of distribution of a first contour point, a second contour point and a third contour point according to an embodiment of the present disclosure.

In an embodiment of the present disclosure, the third contour point is determined on the third contour line of the target object. Assuming that the target object is the target calvarium, the first contour line is the hairline of the target calvarium, the second contour line is the calvarium edge line of the target calvarium, and the third contour line is a calvarium outer curve corresponding to the target calvarium. The calvarium outer curve may be a curve at a certain distance from the calvarium edge line. FIG. 7 is a schematic diagram of distribution of a first contour point, a second contour point, and a third contour point according to an embodiment of the present disclosure, where the third contour point is located on the calvarium outer curve at a certain distance from the calvarium edge line.

In an optional implementation, the third contour point of the target object may have a one-to-one correspondence with the second contour point. It is noted that the embodiment does not limit the numbers and distribution of the first contour point, the second contour point, and the third contour point.

In an optional implementation, the third contour point of the target object in the to-be-processed image may be determined based on a machine learning model. The embodiment does not limit methods for determining the third contour point.

In step S602, a grid corresponding to the target object is constructed based on the first contour point, the second contour point, and the third contour point.

In an embodiment of the present disclosure, after the first contour point, the second contour point, and the third contour point of the target human image are determined, a grid of the target object is constructed based on the first contour point, the second contour point, and the third contour point.

Figure 8:
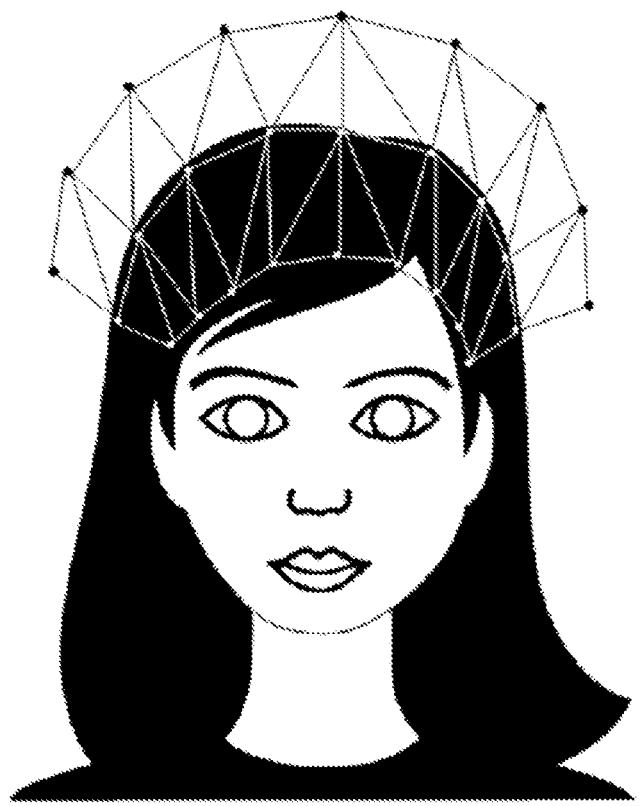
FIG. 8 is a schematic diagram of a grid corresponding to a target calvarium according to another embodiment of the present disclosure.

Assuming that the target object is the target calvarium, FIG. 8 is a schematic diagram of a grid corresponding to a target calvarium according to another embodiment of the present disclosure, that is, a schematic diagram of a grid of the target object constructed based on the first contour point, the second contour point, and the third contour point. It is noted that the embodiment does not limit the construction method of the grid of the target calvarium.

In the embodiment of the present disclosure, the grid of the target object is constructed based on the first contour point, the second contour point, and the third contour point, which can ensure that the grid deformation caused by the shifting of the second contour point in the grid of the target object will not affect the display of the background area outside the third contour line formed by the third contour point, and avoid the background area from being covered by the deformation of the target object, thereby reducing the impact on the display of the background area caused by the deformation of the target object.

In step S603, the second contour point in the grid is shifted based on a deformation parameter corresponding to the target object, to obtain the deformed grid.

The deformation parameter is used to determine shifting data of the second contour point.

The implementation of S603 in this embodiment is similar to that of S203 in the aforementioned embodiment, which can be understood by reference and will not be repeated here.

In step S604, a deformed image corresponding to the target object is generated based on the deformed grid.

In an embodiment of the present disclosure, after the deformed grid is determined, a deformed image corresponding to the target object is drawn based on the deformed grid.

In an optional implementation, firstly a target area enclosed by the second contour point before and after being shifted in the deformed grid is determined, and then a positional relationship between the target area and a predetermined area of the target object is determined. Specifically, the positional relationship is used to indicate whether the target area is in the predetermined area of the target object. Then, based on the positional relationship, the target area is drawn to obtain the deformed image corresponding to the target object.

Figure 9:
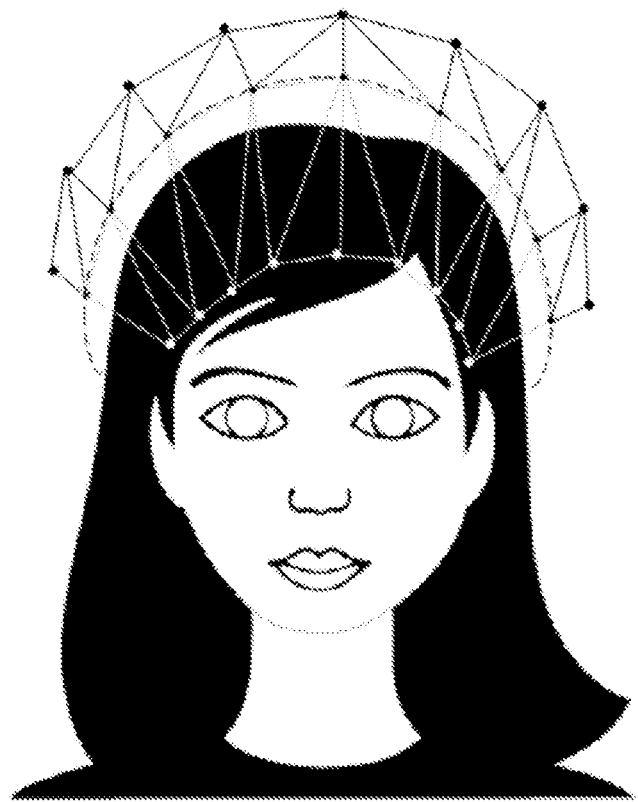
FIG. 9 is a schematic diagram of a target area according to an embodiment of the present disclosure.

Assuming that the target object is the target calvarium, FIG. 9 is a schematic diagram of a target area according to an embodiment of the present disclosure. The contour line formed by the second contour point after the deformation is shown as the dashed line in FIG. 9. The area enclosed by the dashed line and the second contour line formed by the second contour points before deformation (i.e. the calvarium edge line) is the target area. If the target area is in the predetermined area of the target object (such as the hair area), it indicates that the deformation of the calvarium has the effect of lowering the target calvarium. Otherwise, if the target area is not in the predetermined area of the target object, it indicates that the deformation of the calvarium has the effect of raising the target calvarium. For example, as shown in FIG. 9, the target area is not in the predetermined area of the target object, that is, the target area is not in the hair area, which indicates that the target calvarium needs to be raised.

If it is determined that the target area is not in the predetermined area of the target object, the target area is drawn based on the image data in the area enclosed by the first contour line and the second contour line on the to-be-processed image, to obtain the deformed image corresponding to the target object.

Assuming that the target object is the calvarium and the target area is not in the hair area, it is necessary to draw the target area based on the image data in the hair area. Specifically, image data in the region enclosed by the first contour line and the second contour line on the to-be-processed image is obtained, and then the target area is draw based on the image data to obtain the deformed image corresponding to the target object.

If it is determined that the target area is in the predetermined area of the target object, the target area is drawn based on image data in the area enclosed by the second contour line and the third contour line on the to-be-processed image, to obtain the deformed image corresponding to the target object.

Assuming that the target object is the calvarium and the target area is located in the hair area, the target area is drawn based on image data in the area enclosed by the calvarium outer curve and the calvarium edge line to obtain the deformed image corresponding to the target calvarium.

In an optional implementation, assuming that the target object is the target calvarium, if it is determined that the target area is not in the hair area of the target calvarium, it indicates that the deformation of the calvarium may raise the target calvarium. In this case, an area enclosed by the shifted second contour point and the third contour point in the deformed grid is drawn in a compressing manner, based on image data in an area enclosed by the second contour line and the third contour line on the to-be-processed image. The raising of the target calvarium caused by the deformation of the calvarium can cause deformation of the background area around the calvarium. In order to eliminate the influence of deformation of the calvarium on the background area, the area enclosed by the calvarium outer curve and the calvarium edge line is drawn in a compressing manner. In this way, the influence of deformation of the calvarium on the background area is controlled to be in the area limited by the calvarium outer curve, avoiding the display effect of covering the background area around the target calvarium by the deformed calvarium, and thus improving the effect of image processing.

In an optional implementation, if it is determined that the target area is located in the hair area of the target calvarium, it indicates that the deformation of the calvarium may lower the target calvarium. In this case, an area enclosed by the shifted second contour point and the third contour point in the deformed grid is drawn in a stretching manner, based on image data in an area enclosed by the second contour line and the third contour line on the to-be-processed image.

Figure 10:
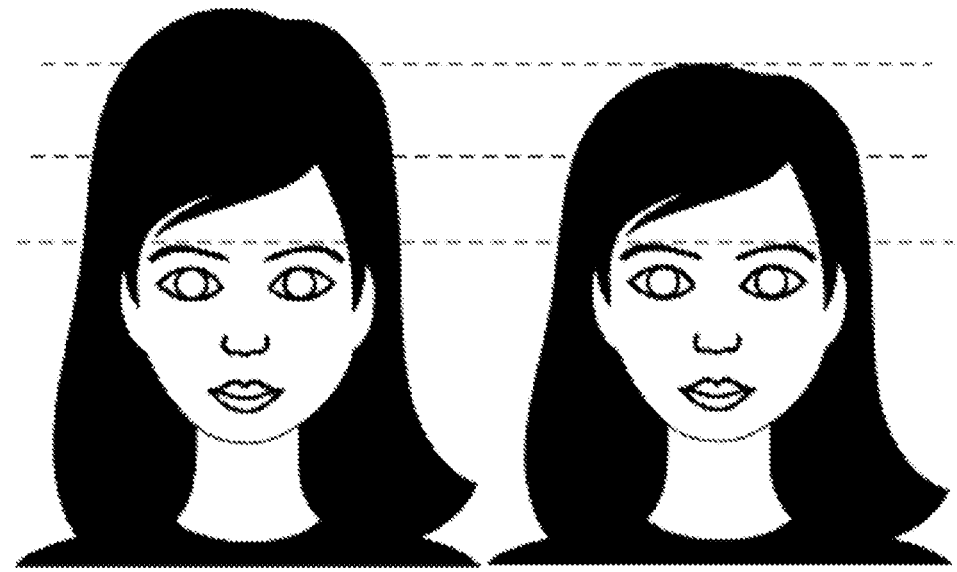
FIG. 10 shows drawing effects of a target human image after a target calvarium is raised or lowered according to an embodiment of the present disclosure.
Figure 10:
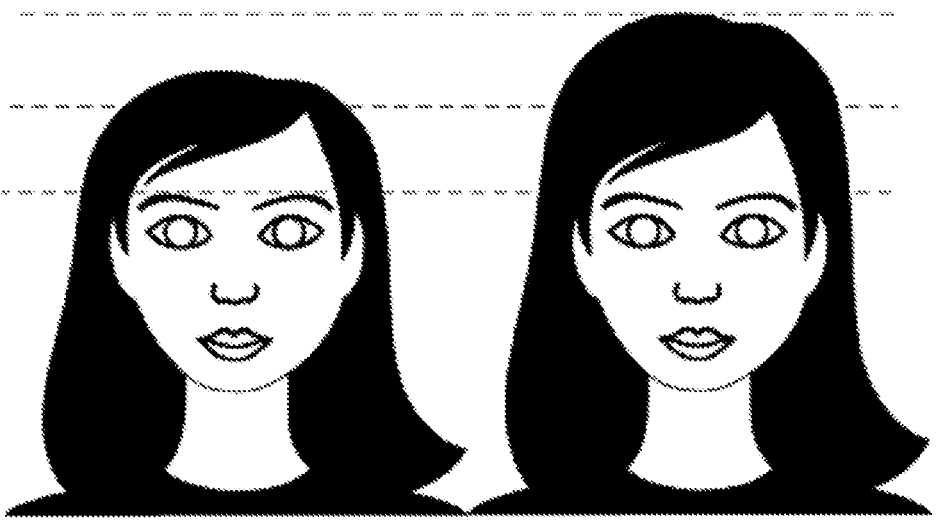

Assuming that the target object is the target calvarium, FIG. 10 shows drawing effects of the target calvarium raised or lowered according to an embodiment of the present disclosure. It can be seen that raising or lowering the target calvarium through the deformation of the calvarium improves the aesthetic degree of the target calvarium.

In the image processing method according to the embodiments of the present disclosure, firstly, a first contour point and a second contour point of a target object on a to-be-processed image are determined, where the first contour point is on a first contour line of the target object, and the second contour point is on a second contour line of the target object. A grid corresponding to the target object is constructed based on the first contour point and the second contour point; and the second contour point in the grid are shifted based on a deformation parameter corresponding to the target object, to obtain a deformed grid. Then, a deformed image corresponding to the target object is generated based on the deformed grid. Therefore, in the embodiments of the present disclosure, an image processing function is achieved by deforming the grid of the target object in the to-be-processed image, which can improve the display effect of the target object in the to-be-processed image and improve the user experience.

In addition, with the embodiments of the present disclosure, the deformation of the target object is achieved through the deformation of the grid by shifting the second contour point in the grid of the target object. Since neither the first contour point nor the third contour point in the grid of the target object are shifted, it is ensured that the background area affected by the deformation of the target object is limited by the third contour line where the third contour point is located, avoiding the background area from being covered by the deformation of the target object, reducing the impact of the deformation of the target object on the display of the background area, and thus improving the user experience.

Figure 11:
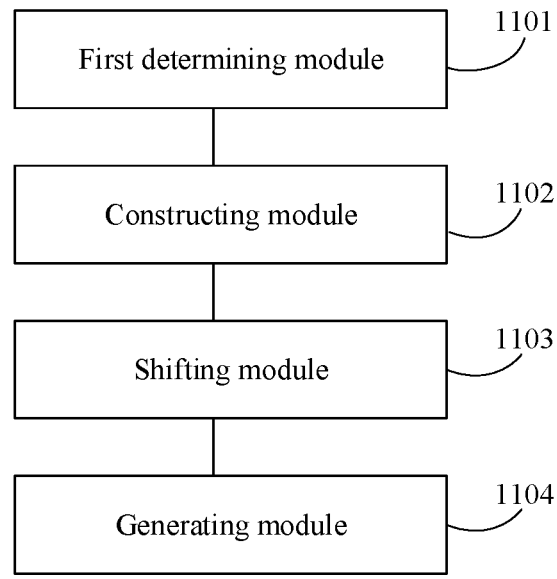
FIG. 11 is a schematic structural diagram of an image processing apparatus according to an embodiment of the present disclosure.

Based on the above method embodiment, an image processing apparatus is provided according to the present disclosure. FIG. 11 is a schematic structural diagram of an image processing apparatus according to an embodiment of the present disclosure. The apparatus includes: a first determining module 1101, a constructing module 1102, a shifting module 1103 and a generating module 1104.

The first determining module 1101 is configured to determine a first contour point and a second contour point of a target object in a to-be-processed image, where the first contour point is on a first contour line of the target object, and the second contour point is on a second contour line of the target object.

The constructing module 1102 is configured to construct a grid corresponding to the target object based on the first contour point and the second contour point.

The shifting module 1103 is configured to shift the second contour point in the grid based on a deformation parameter corresponding to the target object, to obtain a deformed grid, where the deformation parameter is used to determine shifting data of the second contour point.

The generating module 1104 is configured to generate a deformed image corresponding to the target object based on the deformed grid.

In an optional embodiment, the apparatus further includes: a second determination module configured to determine a third contour point of the target object, where the third contour point is on a third contour line of the target object.

Correspondingly, the construction module is configured to: construct the grid corresponding to the target object based on the first contour point, the second contour point and the third contour point.

In an optional implementation, the deformation parameter includes a deformation input parameter and preset deformation key point. The shifting module includes: a first determining sub-module, a second determining sub-module, a third determining sub-module and a first shifting sub-module.

The first determining sub-module is configured to determine a target second contour point from the second contour point in the grid, and determining a target deformation key point from the preset deformation key point.

The second determining sub-module is configured to determine whether the target second contour point is in an influence area of the target deformation key point based on a distance between the target second contour point and the target deformation key point, to obtain a determination result, where the determination result is used to indicate whether the target second contour point is in the influence area of the target deformation key point.

The third determining sub-module is configured to determine shifting data corresponding to the target second contour point based on the determination result; and The first shifting sub-module is configured to shift the target second contour point in the grid based on the shifting data, to obtain the deformed grid.

In an optional implementation, the third determining sub-module is specifically configured to: in a case that the determination result indicates that the target second contour point is in the influence area of the target deformation key point, determine the shifting data corresponding to the target second contour point based on the deformation input parameter corresponding to the target object and a preset directional vector corresponding to the target deformation key point.

The shifting data corresponding to the target second contour point includes a shifting direction and a shifting distance of the target second contour point, the deformation input parameter is used to determine the shifting direction and shifting distance, and the preset directional vector is used to determine the shifting direction.

In an optional implementation, the third determining sub-module includes: a fourth determining sub-module and a fifth determining sub-module.

The fourth determining sub-module is configured to determine a first shifting parameter corresponding to the target second contour point, based on a distance between the target second contour point and the target deformation key point.

The fifth determining sub-module is configured to determine the shifting data corresponding to the target second contour point based on the first shifting parameter, the deformation input parameter corresponding to the target object, and the preset directional vector corresponding to the target deformation key point.

In an optional implementation, the target deformation key point includes a preset key point pair, and the preset directional vector corresponding to the target deformation key point is determined by the preset key point pair.

In an optional implementation, the first determining module is specifically configured to: determine the first contour point and the second contour point of the target object in the to-be-processed image based on a machine learning model.

In an optional implementation, the generating module includes: a sixth determining sub-module and a first drawing sub-module.

The sixth determining sub-module is configured to determine, in the deformed grid, a target area enclosed by the second contour points before and after being shifted.

The first drawing sub-module is configured to draw the target area based on a positional relationship between the target area and a predetermined area of the target object, to obtain the deformed image corresponding to the target object.

In an optional implementation, the first drawing sub-module is specifically configured to: in response to determining that the target area is not in the predetermined area of the target object, draw the target area based on image data in an area enclosed by the first contour line and the second contour line on the to-be-processed image, to obtain the deformed image corresponding to the target object.

In an optional embodiment, the apparatus further includes: a second drawing sub-module configured to draw; in a compressing manner, an area enclosed by the shifted second contour point and the third contour point in the deformed grid, based on image data in an area enclosed by the second contour line and the third contour line on the to-be-processed image.

In an optional implementation, the first drawing sub-module is specifically configured to: in response to determining that the target area is in the predetermined area of the target object, draw the target area based on image data in an area enclosed by the second contour line and the third contour line on the to-be-processed image, to obtain the deformed image corresponding to the target object.

In an optional embodiment, the apparatus further includes: a third drawing sub-module configured to draw; in a stretching manner, an area enclosed by the shifted second contour point and the third contour point in the deformed grid, based on image data in an area enclosed by the second contour line and the third contour line on the to-be-processed image.

In the image processing apparatus according to the embodiments of the present disclosure, firstly, a first contour point and a second contour point of a target object on a to-be-processed image are determined, where the first contour point is on a first contour line of the target object, and the second contour point is on a second contour line of the target object. A grid corresponding to the target object is constructed based on the first contour point and the second contour point; and the second contour point in the grid is shifted based on a deformation parameter corresponding to the target object, to obtain a deformed grid. Then, a deformed image corresponding to the target object is generated based on the deformed grid. Therefore, in the embodiments of the present disclosure, an image processing function is achieved by deforming the grid of the target object in the to-be-processed image, which can improve the display effect of the target object in the to-be-processed image and improve the user experience.

In addition to the above method and apparatus, a computer-readable storage medium is provided in the present disclosure. The computer-readable storage medium stores instructions. The instructions, when being executed by a terminal device, cause the terminal device to perform the method in any one of the above embodiments of the present disclosure.

A computer program product is provided in the present disclosure, where the computer program product includes a computer program/instruction. The computer program/instruction, when being executed by a processor, performs the method in any one of the above embodiments of the present disclosure.

Figure 12:
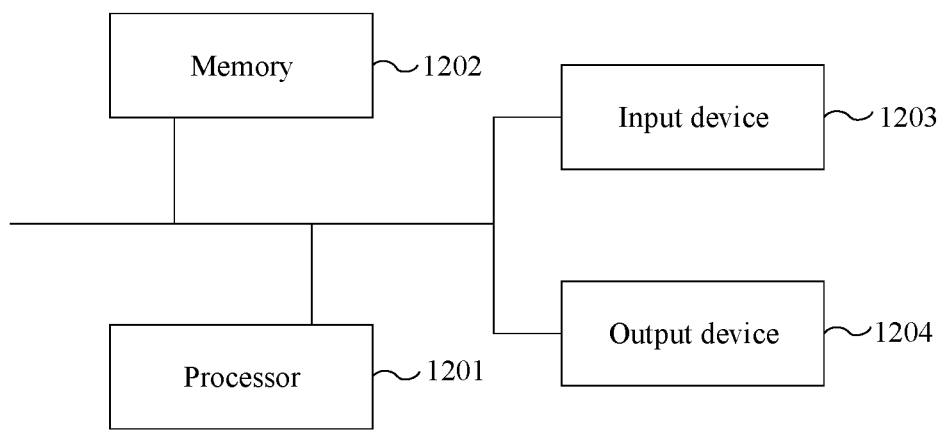
FIG. 12 is a schematic structural diagram of an image processing device according to an embodiment of the present disclosure.

In addition, an image processing device is provided in an embodiment of the present disclosure. As shown in FIG. 12, the image processing device may include: a processor 1201, a memory 1202, an input device 1203, and an output device 1204.

The number of processors 1201 in the image processing device may be one or more, and FIG. 12 shows one processor as an example. In some embodiments of the present disclosure, the processor 1201, the memory 1202, the input device 1203, and the output device 1204 may be connected through a bus or by other means. FIG. 12 shows the bus connection as an example.

The memory 1202 can be used to store software programs and modules. The processor 1201 executes various functional applications and data processing of image processing devices by running software programs and modules stored in the memory 1202. The memory 1202 may mainly include a program storage area and a data storage area. The program storage area may store an operating system, an application program required by at least one function, and the like. In addition, the memory 1202 may include a high-speed random access memory, and may also include a non-volatile memory, such as at least one disk storage device, a flash memory device, or other volatile solid state storage devices. The input device 1203 can be used to receive input digital or character information, and generate signal inputs related to user settings and functional control of the image processing devices.

In this embodiment, the processor 1201 loads the executable files corresponding to processes of one or more application programs into the memory 1202 according to instructions, and the processor 1201 runs the application programs stored in the memory 1202 to implement various functions of the image processing device.

It should be noted that the relationship terms "first", "second" and the like herein are used for distinguishing an entity or operation from another entity or operation, but not intended to necessitate or imply an actual relationship or order between these entities or operations. Furthermore, terms "include", "comprise" or any other variants are intended to cover the non-exclusive inclusion. Therefore, a process, method, article or device including a series of elements not only includes the elements, but may include other elements not expressly listed or inherent to the process, method, article, or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit and the scope of the present disclosure. Therefore, the present disclosure would not be limited to the embodiments described in this specification, but shall conform to the widest scope consistent with the principles and novel features disclosed herein.

The invention claimed is:

1. An image processing method, comprising:
    determining a first contour point and a second contour point of a target object in a to-be-processed image, wherein the first contour point is on a first contour line of the target object, and the second contour point is on a second contour line of the target object;
    constructing a grid corresponding to the target object based on the first contour point and the second contour point;
    shifting the second contour point in the grid based on a deformation parameter corresponding to the target object, to obtain a deformed grid, wherein the deformation parameter is configured to determine shifting data of the second contour point; and
    generating a deformed image corresponding to the target object based on the deformed grid,
    wherein the deformation parameter comprises a deformation input parameter and preset deformation key point, the deformation input parameter is used to indicate an expected deformation degree of the target object, and the preset deformation key point is used to determine the shifting data of the second contour point,
    wherein the shifting the second contour point in the grid based on the deformation parameter corresponding to the target object, to obtain the deformed grid comprises:
        determining a target second contour point from the second contour point in the grid, and determining a target deformation key point from the preset deformation key point;
        determining whether the target second contour point is in an influence area of the target deformation key point based on a distance between the target second contour point and the target deformation key point, to obtain a determination result, wherein the determination result is used to indicate whether the target second contour point is in the influence area of the target deformation key point;
        determining shifting data corresponding to the target second contour point based on the determination result; and
        shifting the target second contour point in the grid based on the shifting data, to obtain the deformed grid.

2. The method according to claim 1, wherein before constructing the grid corresponding to the target object based on the first contour point and the second contour point, the method further comprises:
    determining a third contour point of the target object, wherein the third contour point is on a third contour line of the target object; and
    the constructing the grid corresponding to the target object based on the first contour point and the second contour point comprises:
        constructing the grid corresponding to the target object based on the first contour point, the second contour point and the third contour point.

3. The method according to claim 2, wherein the generating the deformed image corresponding to the target object based on the deformed grid comprises:
    determining, in the deformed grid, a target area enclosed by the second contour points before and after being shifted; and
    drawing the target area based on a positional relationship between the target area and a predetermined area of the target object, to obtain the deformed image corresponding to the target object, wherein the positional relationship is used to indicate whether the target area is in the predetermined area of the target object.

4. The method according to claim 3, wherein the drawing the target area based on the positional relationship between the target area and the predetermined area of the target object, to obtain the deformed image corresponding to the target object comprises:
    in response to determining that the target area is not in the predetermined area of the target object, drawing the target area based on image data in an area enclosed by the first contour line and the second contour line on the to-be-processed image, and obtaining the deformed image corresponding to the target object.

5. The method according to claim 4, wherein before obtaining the deformed image corresponding to the target object, the method further comprises:
    drawing, in a compressing manner, an area enclosed by the shifted second contour point and the third contour point in the deformed grid, based on image data in an area enclosed by the second contour line and the third contour line on the to-be-processed image.

6. The method according to claim 3, wherein the drawing the target area based on the positional relationship between the target area and the predetermined area of the target object, to obtain the deformed image corresponding to the target object comprises:
    in response to determining that the target area is in the predetermined area of the target object, drawing the target area based on image data in an area enclosed by the second contour line and the third contour line on the to-be-processed image, and obtaining the deformed image corresponding to the target object.

7. The method according to claim 6, wherein before obtaining the deformed image corresponding to the target object, the method further comprises:

drawing, in a stretching manner, an area enclosed by the shifted second contour point and the third contour point in the deformed grid, based on image data in the area enclosed by the second contour line and the third contour line on the to-be-processed image.

8. The method according to claim 1, wherein the determining the shifting data corresponding to the target second contour point based on the determination result comprises:

in a case that the determination result indicates that the target second contour point is in the influence area of the target deformation key point, determining the shifting data corresponding to the target second contour point based on the deformation input parameter corresponding to the target object and a preset directional vector corresponding to the target deformation key point, wherein the shifting data corresponding to the target second contour point comprises a shifting direction and a shifting distance of the target second contour point, the deformation input parameter is used to determine the shifting direction and shifting distance, and the preset directional vector is used to determine the shifting direction.

9. The method according to claim 8, wherein the determining the shifting data corresponding to the target second contour point based on the deformation input parameter corresponding to the target object and the preset directional vector corresponding to the target deformation key point comprises:

determining a first shifting parameter corresponding to the target second contour point, based on a distance between the target second contour point and the target deformation key point; and determining the shifting data corresponding to the target second contour point, based on the first shifting parameter, the deformation input parameter corresponding to the target object, and the preset directional vector corresponding to the target deformation key point.

10. The method according to claim 9, wherein the determining the shifting data corresponding to the target second contour point, based on the first shifting parameter, the deformation input parameter corresponding to the target object, and the preset directional vector corresponding to the target deformation key point comprises:

determining the shifting data corresponding to the target second contour point, as a product of the first shifting parameter, the deformation input parameter corresponding to the target object, and the preset directional vector corresponding to the target deformation key point.

11. The method according to claim 8, wherein the target deformation key point comprises a preset key point pair, and the preset directional vector corresponding to the target deformation key point is determined by the preset key point pair.

12. The method according to claim 1, wherein the determining the first contour point and the second contour point of the target object in the to-be-processed image comprises:

determining the first contour point and the second contour point of the target object in the to-be-processed image, based on a machine learning model.

13. The method according to claim 1, wherein the to-be-processed image comprises a human image, the target object is a target calvarium of the human image, the first contour line is a hairline of the target calvarium, and the second contour line is a calvarium edge line of the target calvarium.

14. A non-transitory computer-readable storage medium storing instructions, wherein the instructions, when being executed by a terminal device, cause the terminal device to:

determine a first contour point and a second contour point of a target object in a to-be-processed image, wherein the first contour point is on a first contour line of the target object, and the second contour point is on a second contour line of the target object;

construct a grid corresponding to the target object based on the first contour point and the second contour point;

shift the second contour point in the grid based on a deformation parameter corresponding to the target object, to obtain a deformed grid, wherein the deformation parameter is configured to determine shifting data of the second contour point; and generate a deformed image corresponding to the target object based on the deformed grid, wherein the deformation parameter comprises a deformation input parameter and preset deformation key point, the deformation input parameter is used to indicate an expected deformation degree of the target object, and the preset deformation key point is used to determine the shifting data of the second contour point, wherein the instructions, when being executed by a terminal device, cause the terminal device further to:

determine a target second contour point from the second contour point in the grid, and determine a target deformation key point from the preset deformation key point;

determine whether the target second contour point is in an influence area of the target deformation key point based on a distance between the target second contour point and the target deformation key point, to obtain a determination result, wherein the determination result is used to indicate whether the target second contour point is in the influence area of the target deformation key point;

determine shifting data corresponding to the target second contour point based on the determination result; and shift the target second contour point in the grid based on the shifting data, to obtain the deformed grid.

15. A device, comprising:

a memory, a processor, and a computer program stored in the memory and executable by the processor, wherein the computer program, when executed by the processor, causes the processor to:

determine a first contour point and a second contour point of a target object in a to-be-processed image, wherein the first contour point is on a first contour line of the target object, and the second contour point is on a second contour line of the target object;

construct a grid corresponding to the target object based on the first contour point and the second contour point;

shift the second contour point in the grid based on a deformation parameter corresponding to the target object, to obtain a deformed grid, wherein the deformation parameter is configured to determine shifting data of the second contour point; and generate a deformed image corresponding to the target object based on the deformed grid, wherein the deformation parameter comprises a deformation input parameter and preset deformation key point, the deformation input parameter is used to indicate an expected deformation degree of the target object, and the preset deformation key point is used to determine the shifting data of the second contour point, wherein the computer program, when executed by the processor, causes the processor further to:
  determine a target second contour point from the second contour point in the grid, and determine a target deformation key point from the preset deformation key point;
  determine whether the target second contour point is in an influence area of the target deformation key point based on a distance between the target second contour point and the target deformation key point, to obtain a determination result, wherein the determination result is used to indicate whether the target second contour point is in the influence area of the target deformation key point;
  determine shifting data corresponding to the target second contour point based on the determination result; and
  shift the target second contour point in the grid based on the shifting data, to obtain the deformed grid.

16. The device according to claim 15, wherein the computer program, when executed by the processor, causes the processor to:
  determine a third contour point of the target object, wherein the third contour point is on a third contour line of the target object; and
  construct the grid corresponding to the target object based on the first contour point, the second contour point and the third contour point.

* * * * *